(12) United States Patent
Wu et al.

(10) Patent No.: US 7,494,232 B2
(45) Date of Patent: Feb. 24, 2009

(54) PASSIVE BROADBAND LONG WAVE AND MID-WAVE INFRARED OPTICAL LIMITER DEVICE

(75) Inventors: Pingfan Wu, Niskayuna, NY (US); George Dalakos, Niskayuna, NY (US); Brian Lawrence, Clifton Park, NY (US); Peter Lorraine, Niskayuna, NY (US); William Taylor Yenisch, Longwood, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 159 days.

(21) Appl. No.: 11/012,138

(22) Filed: Dec. 16, 2004

(65) Prior Publication Data

US 2006/0132906 A1    Jun. 22, 2006

(51) Int. Cl.
*G02B 27/00*    (2006.01)
*G02F 1/01*    (2006.01)

(52) U.S. Cl. .................. 359/607; 359/601; 359/359; 385/131

(58) Field of Classification Search ......... 359/350–361, 359/577–590, 601–614; 385/131; 250/330–352
See application file for complete search history.

(56) References Cited

U.S. PATENT DOCUMENTS

| | | | |
|---|---|---|---|
| 4,283,113 A * | 8/1981 | Eden ............................ | 385/18 |
| 4,343,182 A * | 8/1982 | Pompei ....................... | 374/31 |
| 5,347,395 A | 9/1994 | Lautenschlager et al. ... | 359/355 |
| 5,348,688 A * | 9/1994 | Sharp et al. ................. | 252/582 |
| 5,589,101 A | 12/1996 | Khoo ..................... | 252/299.01 |
| 5,796,107 A * | 8/1998 | Buchtemann et al. ....... | 250/351 |
| 6,121,618 A * | 9/2000 | Morris ......................... | 250/352 |
| 6,392,233 B1 | 5/2002 | Channin et al. .......... | 250/338.1 |
| 6,649,912 B2 * | 11/2003 | Salapow et al. ............. | 250/330 |
| 6,738,203 B2 * | 5/2004 | Ando et al. .................. | 359/885 |
| 6,787,775 B1 * | 9/2004 | Bielefeld et al. ............ | 250/330 |
| 7,177,516 B1 * | 2/2007 | Ahn ........................... | 385/131 |
| 2004/0223533 A1 * | 11/2004 | Dishaw et al. ................. | 374/4 |

OTHER PUBLICATIONS

Perazzo et al., "Infrared vision using uncooled micro-optomechanical camera," *Applied Physics Letters*, vol. 74, No. 23, Jun. 7, 1999, pp. 3567-3569.

Danilov, et al., "Effect of intense laser radiation on controlled VO2 mirrors," *J. Opt. Technol.*, vol. 67, Jun. 2000, pp. 526-531.

(Continued)

*Primary Examiner*—Thong Nguyen
(74) *Attorney, Agent, or Firm*—Birch, Stewart, Kolasch, & Birch, LLP

(57) ABSTRACT

Method for limiting amount of radiation impinging on a radiation-sensitive detector device by directing radiation toward the detector, permitting the radiation to impinge upon the detector device when the radiation is below a predetermined threshold, and utilizing radiation having wavelengths different from signals of interest to initiate limiting of the radiation impinging upon the detector when the predetermined threshold is exceeded. The optical limiter includes an IR limiting layer pair selected so that energy from visible and near infrared radiation activates the optical limiter. The limiting layer pair may includes a layer closer to the source of radiation of e.g. vanadium dioxide, vanadium sesquioxide, or germanium crystal and a layer further from the source of radiation of e.g. chalcogenide glass, germanium crystal, or sodium chloride crystal.

8 Claims, 4 Drawing Sheets

OTHER PUBLICATIONS

Segaud, et al., "VO2 and Au-VO2 thin films prepared by sputtering and sol-gel for infrared optical power limiting," *Nonlinear Optics*, 1999, vol. 21, pp. 211-224.

Mikheeva et al., "Features of the limitation of laser radiation by mirrors based on vanadium dioxide" J. Opt. Technol. 68 (4), Apr. 2001, pp. 278-281.

Oden et al., "Uncooled thermal imaging using a piezoresistive microcantilever," *Appl. Phys. Lett.* 69 (21) Nov. 18, 1996, pp. 3277-3279.

Manalis, et al., "Two-dimensional micromechanical bimorph arrays for detection of thermal radiation," *Appl. Phys. Lett.* 70 (24), Jun. 16, 1997, pp. 3311-3313.

De Natale, J.F., "Thin film optical switching materials," *Mat. Res. Soc. Symp. Proc.*, vol. 374, Materials Research Society, C1995, pp. 87-97.

Konovalova, et al., Interference systems of controllable mirrors based on vanadium dioxide for the spectral range 0.6-10.6 um, *J. Opt. Technol.*, 66 (5), May 1999, pp. 391-398.

Suh, et al., "Semiconductor to metal phase transition in the nucleation and growth of VO2 nanoparticles and thin films," *J. Applied Physics*, vol. 98 (2), Jul. 15, 2004, pp. 1209-1213.

LoPrestl, et al., "All-Optical Switching of Infrared Optical Radiation Using Isotropic Liquid Crystal," *IEEE Journal of Quantum Electronics*, vol. 31, No. 4, Apr. 1995, pp. 723-728.

* cited by examiner

PASSIVE BROADBAND LONG WAVE AND MID-WAVE INFRARED OPTICAL LIMITER DEVICE

FIELD OF THE INVENTION

This invention provides a passive infrared (IR) optical limiter device for long wave and mid-wave infrared radiation detector protection. With respect to infrared wavelengths, wavelengths of approximately 7 to 14 microns are considered to be in the long wave infrared radiation (LWIR) region and wavelengths of approximately 3 to 5 microns are considered to be in the mid-IR region. This invention provides an optical limiter for detectors in the LWIR region. The optical limiter of this invention can also be used in the mid-IR region. In a preferred embodiment, the optical limiter device of this invention comprises an IR limiting layer pair comprising vanadium oxide and a suitable substrate, for instance germanium or AMTIR or sodium carbonate.

BACKGROUND OF THE INVENTION

Optical limiters are used for the protection—for instance of eyes, of photodetectors, or of cameras—against unexpected strong illumination. The present invention provides an optical power limiting device, primarily for protection in the LWIR region. The optical limiter of this invention is transparent under a low level of illumination at the wavelength of interest, but is "dark" under strong incident light power. For incident power that exceeds the power threshold of the present optical limiter, the optical signal power transmitted through the optical limiter is substantially constant (at the threshold level), no matter what the incident power is. Optical limiters of the present invention have low initiating thresholds and broad spectral ranges.

Optical limiting devices have been made with Reverse Saturable Absorber (RSA) solutions and multi-photon absorber dyes. Such materials absorb more light as the intensity of the incident light increases. A disadvantage of such materials arises from their use of nonlinear optical absorption processes. This leads to a high threshold for the optical limiting behavior to switch on. More importantly, unlike the present invention, conventional RSA or multi-photon solutions cannot be used in the LWIR region.

The use of vanadium oxide interference mirrors for optical limiting in the LWIR region has been proposed. See Konovalova et al., "Interference systems of controllable mirrors based on vanadium dioxide for the spectral range 0.6-10.6 μm", J. Opt. Technol., 66 (5):391-398 (1999). The device proposed by Konovalova et al. would use vanadium oxide film to absorb incident laser energy and change phase. A primary function of the Konovalova limiter is laser hardening. It is therefore a relatively narrowband device that is not suitable for handling a broadband range of wavelengths. The Konovalova approach requires an initiating threshold on the order of 1 MW/cm$^2$, which is too high for many applications. A mid-IR and LWIR range limiter, for instance, must limit a continuous wave having a broad band but having relatively low peak power radiation (about 1 W/cm$^2$).

It is well known that vanadium dioxide (VO$_2$) thin films experience phase change from semiconductor to metal at around 68° C. Since this phase change is solid to solid, the phase change speed can be as fast as less than 150 femtoseconds. In the phase change process, the refractive index of the VO$_2$ varies dramatically. For example, at a wavelength of 10.6 microns, the refractive index of VO$_2$ varies from 2.55-0.08i in the semiconductor phase to 8-9i in the metal phase. At the different refractive indexes, the electromagnetic radiation is transmitted through or reflected by the film.

FIG. 1A, taken from Verleur et al., Physics Review, 172(3): 788-798 (1968), depicts the temperature dependence of optical transmission at 0.31 eV and resistivity of a 1000 Å film of VO$_2$. FIG. 1A shows that the transmission through the film can vary from 90% to 10% as temperature increases from 60° C. to 70° C.

As illustrated in FIG. 1B, taken from Barker et al., Physics Review Letters, 17(26):1286-1289, the variation of refractive index or transmission through the film is broadband, from near-IR to mid-IR to LWIR. In FIG. 1B, the solid curve is a fit for T<T$_t$ using eight phonon modes and one band-structure mode. The crosses and squares show the data above T$_t$. The squares are low because of sample cracking. However, they illustrate the monotonic rise expected of free carrier reflection. The triangle points were taken upon cooling. Because of thermal hysteresis, T$_t$≈63° C. for this run. The present invention makes use of this variable characteristic of the film to provide a broadband optical limiting device.

An object of the present invention is to protect detector devices such as LWIR cameras against damage from continuous wave broadband radiation, such as sunlight. Because of its high temperature and brightness, continuous wave radiation can be more harmful to a detector such as a camera than a pulsed narrow bandwidth laser would be. On the other hand, because of its high temperature, the continuous wave radiation has hundreds of times more energy in the visible and near infrared spectrum than in the long wave infrared region. The present invention makes use of the energy from visible and near infrared radiation to heat and trigger the optical limiting function of the present optical limiter devices.

SUMMARY OF THE INVENTION

In one embodiment, the present invention provides a passive broadband long wave infrared radiation (LWIR) optical limiter device made with an IR limiting layer pair selected so that energy from visible and near infrared radiation activates the LWIR optical limiter. The present invention also contemplates a camera protected against sunlight by the incorporation into the camera of a passive broadband LWIR optical limiter device as described herein. The IR limiting layer pair of this invention preferably includes an external layer closer to the source of radiation comprises a material—for example, vanadium dioxide, vanadium sesquioxide, or germanium crystal—that can change quickly from a semiconductor phase to a metal phase upon heating and an internal layer further from the source of radiation comprises material—for example, chalcogenide glass, germanium crystal, or sodium chloride crystal—that strongly absorbs radiation except for radiation of the wavelength region to which the detector is sensitive.

This invention also provides a method for limiting the amount of radiation impinging on a radiation-sensitive detector device that is responsive to signals of interest having infrared wavelengths of approximately 3 to 14 microns. Such a radiation-sensitive detector device may be, for instance, an infrared camera. This method includes: directing radiation toward the radiation-sensitive detector device, for instance by exposing it to a source of infrared radiation and to ambient sunlight; permitting the radiation to impinge upon, for instance, an infrared focal plane array within the radiation-sensitive detector device when the radiation is below a predetermined threshold (e.g., when the heat generated by the infrared radiation and the ambient sunlight is no greater than 1 W/cm$^2$); and utilizing radiation having wavelengths different from the signals of interest to initiate limiting of the radiation impinging upon the radiation-sensitive detector device when the predetermined threshold is exceeded. More specifically, this last step may, for instance, utilize heat generated by the radiation having wavelengths different from the signals of interest to change the state of a material in the path of the infrared radiation from a semiconductor phase to a metal phase, thereby preventing impingement of the infrared radiation on the infrared focal plane array in the camera.

In a variant method of this invention, the signals of interest have infrared wavelengths of approximately 7 to 14 microns, and the radiation used to initiate limiting of the radiation impinging upon the radiation-sensitive detector device includes radiation having wavelengths in the range 3 to 5 microns.

BRIEF DESCRIPTION OF THE DRAWINGS

The present invention will be more fully understood from the detailed description given hereinafter and from the accompanying drawings. The drawings are not to scale, and are presented for illustrative purposes only. Thus the drawings are not intended to limit the present invention.

DETAILED DESCRIPTION OF THE INVENTION

This invention provides a passive IR optical limiter device for long wave infrared radiation (LWIR) detector protection. The LWIR optical limiter of the present invention makes use of a phase change in a $VO_2$ film at around 68° C., at which temperature the $VO_2$ changes from a semiconductor phase to a metal phase. While the semiconductor phase is essentially transparent, the metal phase is essentially opaque. A material—which strongly absorbs all optical radiation except in the wavelength region that the detector is interested in—is provided as a thin substrate layer attached to the $VO_2$ thin film. When the intensity of the incident light illumination is over a certain threshold, the temperature of the $VO_2$ film increases to over the 68° C. phase change temperature, and the $VO_2$ film changes from "transparent" to "dark".

Since the attached layer or substrate absorbs radiation, the LWIR optical limiter of this invention is designed for relatively low peak power, continuous wave, broad bandwidth light fluence. An important feature of the LWIR limiter device of the present invention is that it is broadband, covering the whole LWIR region. The attached layer which makes up part of the present device strongly absorbs solar radiation, so that the optical limiter's temperature can increase quickly and respond quickly to a variation in the solar radiation. The LWIR optical limiter of this invention is a true passive device, but nonetheless it provides a quick response. Being composed principally of two thin layers, it is small, compact, and light.

The LWIR optical limiter of this invention is designed for use in an environment subject to continuous wave incident light (e.g., sunlight). However, the optical limiter of this invention can also be used in laser hardening. The $VO_2$ film has a very small absorption in the LWIR region, and this absorption by the $VO_2$ film increases with increasing temperature. A high intensity (~1 MW/cm$^2$) incident laser pulse can increase the film temperature dramatically, so that the film reaches the phase change temperature in, e.g., 10 to 30 nanoseconds. The laser energy is then either absorbed or reflected by the $VO_2$ film before it reaches the detector.

Figure 1A:
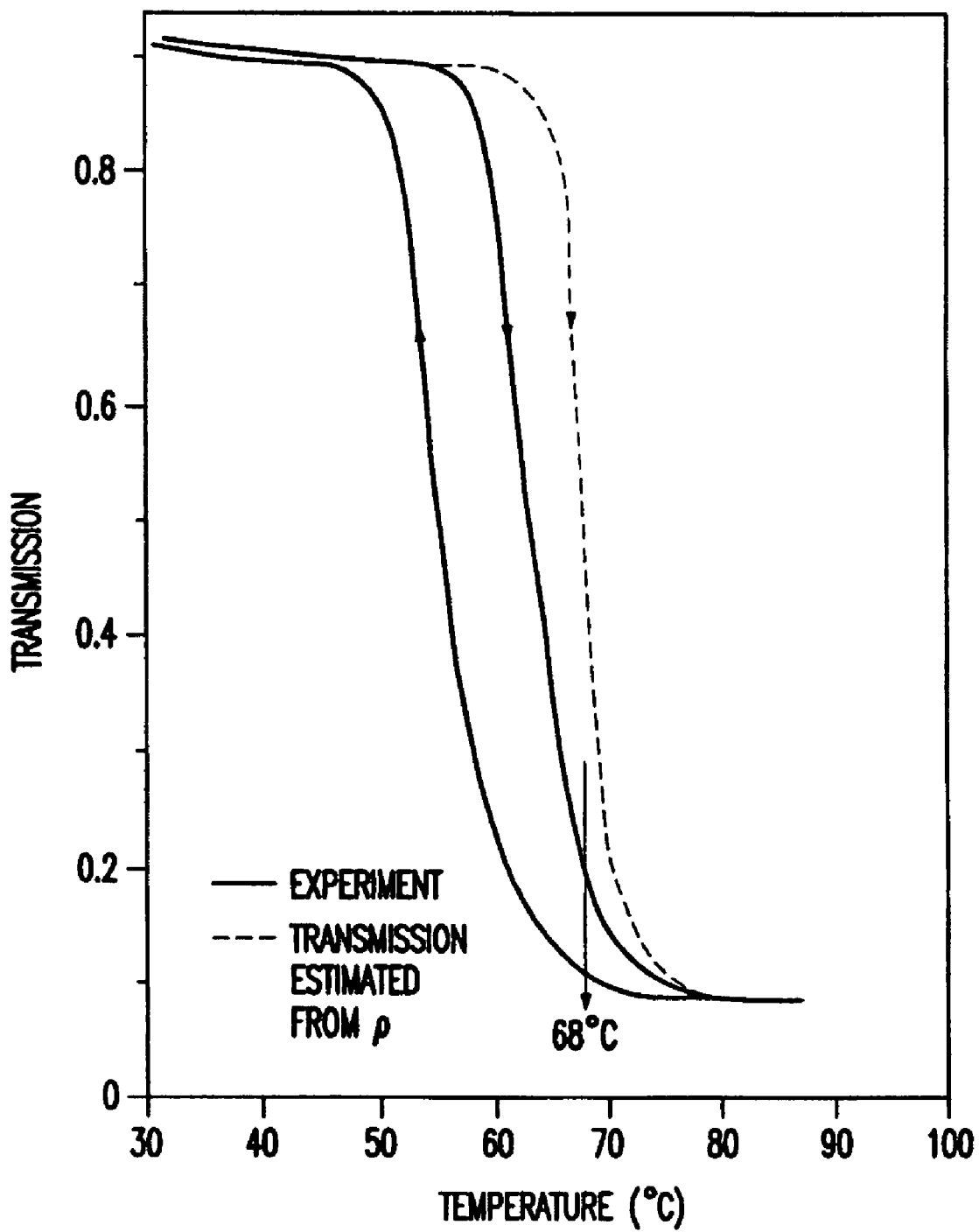
FIG. 1A depicts the temperature dependence of optical transmission in a $VO_2$ film.
Figure 1B:
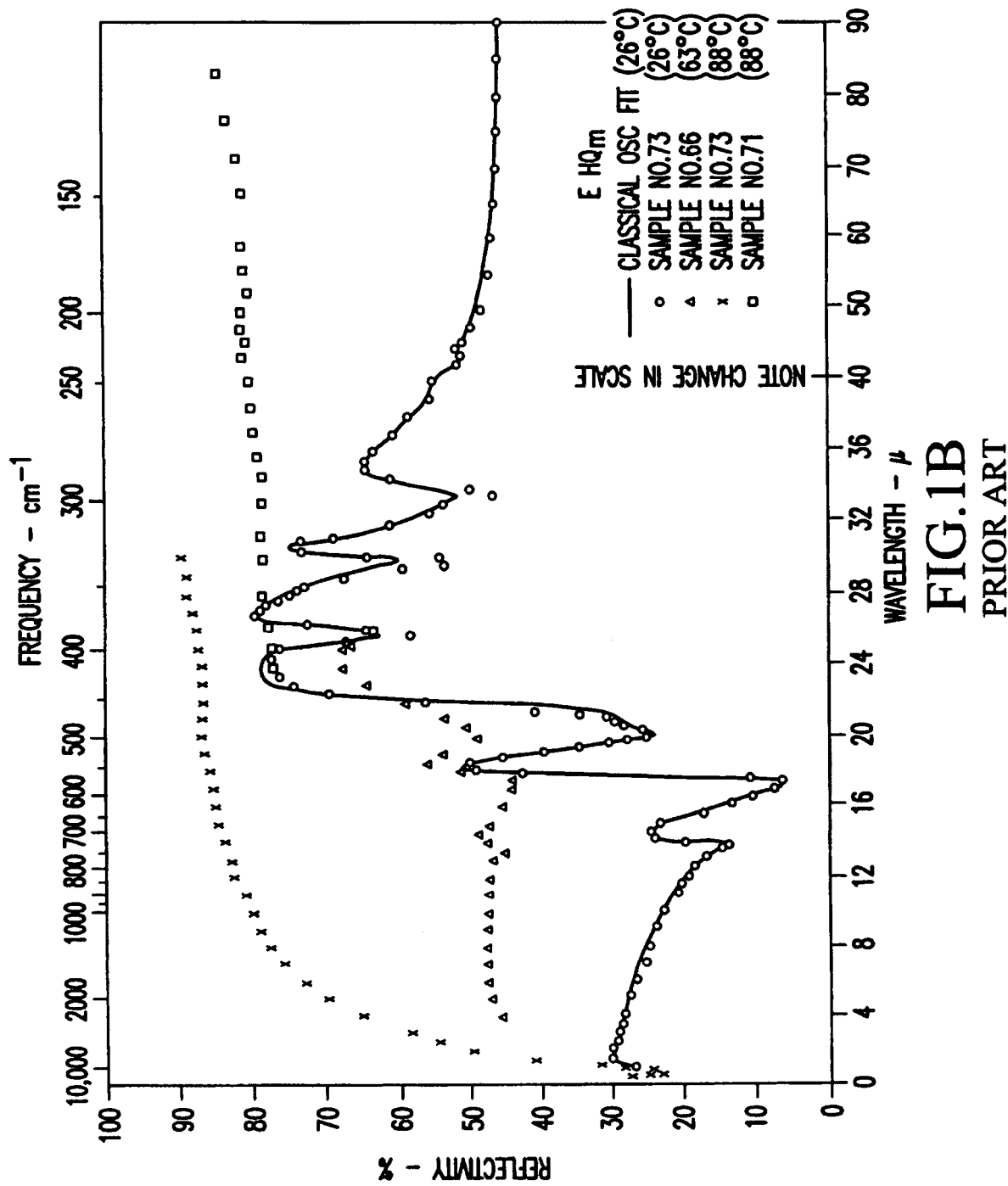
FIG. 1B shows the variation of refractive index or transmission through a $VO_2$ film.
Figure 2A:
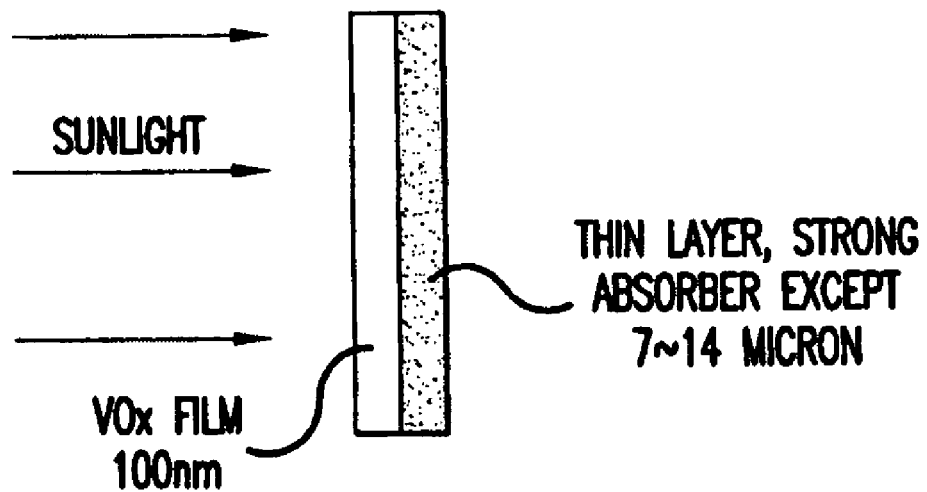
FIG. 2A is a schematic cross-sectional illustration of a two layer device of the present invention.

The LWIR limiting device of the present invention may comprise a $VO_2$ film having a thickness of 10-1000 nm, preferably about 100 nm. Attached to the $VO_2$ film is a thin layer of a substrate material that strongly absorbs any radiation except the wavelength region to which the detector is sensitive. Germanium crystal is one such material. Various salts, e.g. sodium chloride, may also be used as the substrate material. Sodium chloride crystal has a low refractive index and is transparent to radiation having wavelengths of from 0.2 to 15 microns. A preferred material for this component of the optical limiter device of the present invention is AMTIR. The name AMTIR is an acronym for amorphous material transmitting infrared radiation. More specifically, AMTIR is a chalcogenide ($As_xGe_ySe_z$) type glass-like amorphous material with high homogeneity that is able to transmit in the infrared. AMTIR1, for instance, is used for infrared windows, lenses, and prisms when transmission in the range of 1-14microns is desired. AMTIR1s composition of $Ge_{33}As_{12}Se_{55}$ makes it somewhat similar to germanium in its mechanical and optical properties. AMTIR1performs especially well in the 8- 12 micron spectral region where its absorption and dispersion are the lowest. AMTIR1 materials are available commercially, for instance from Argus International, Ltd., of Scotts Valley, Calif. The $VO_2$ film-containing LWIR limiting device of the present invention mentioned above may comprise a $Ge_{33}As_{12}Se_{55}$ about 0.1 to 5 mm in thickness. The two-layer device of the present invention is illustrated schematically in FIG. 2A.

Figure 2B:
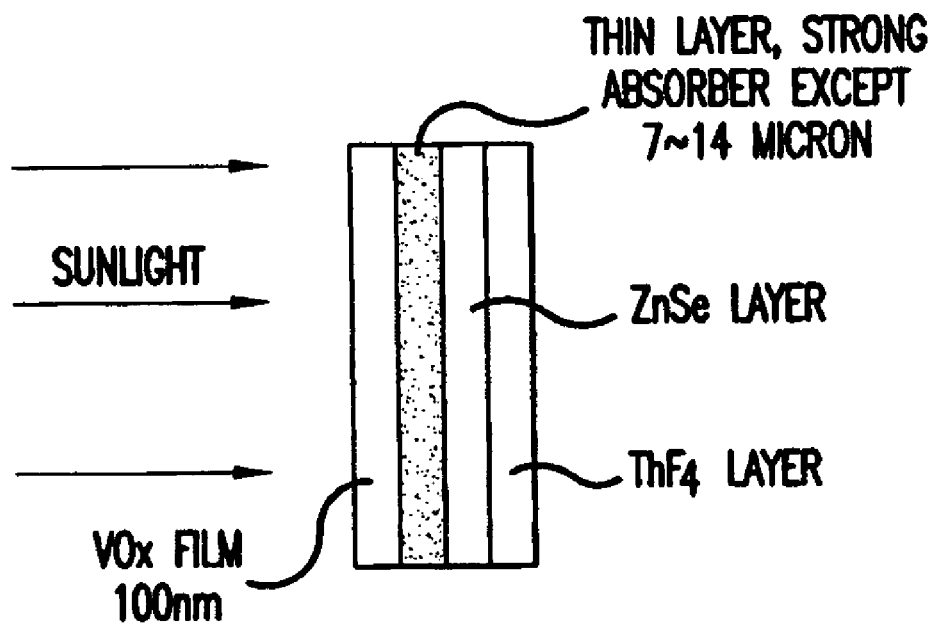
FIG. 2B is a schematic cross-sectional illustration of a multi-layer layer device of the present invention.

The two-layer device described above is the basic embodiment of the present invention. However, optical limiters in accordance with this invention may contain additional layers, as illustrated schematically in FIG. 2B, For instance a broadband interference filter coating may be positioned on the surface of the substrate layer away from the $VO_2$ layer. The broadband interference filter coating transmits radiation signal which has wavelength in the region of 7~14 microns but reflects the radiation of all the other wavelengths. One example of such a coating is made from thorium fluoride and zinc selenide. The thorium fluoride is coated directly onto the prism, and it is covered by a layer of zinc selenide. Both the $ThF_4$ layer and the ZnSe layer are about 10 to 1000 nanometers in thickness. Such coatings provide transmittance of up to 98.5% throughout the 7-14 micron wavelength range. Another optional coating layer that may be used in connection with the present invention is a protective coating over the $VO_2$ layer.

The detection sensitive wavelength range for a detector in accordance with the present invention is 8 to 12 microns for cooled detector or 7 to 14 microns for uncooled detector. The $VO_2$ film employed in this invention is so thin that it does not need much heat to increase its temperature. At room temperature, the $VO_2$ is in its semiconductor phase and has a low refractive index, so that it absorbs very little radiation. The attached layer, as indicated above, does not absorb the radiation to which the detector is sensitive. The optical limiter of this invention is thus "transparent" to incident low-intensity light. However, continuous wave harmful "bright" illumination, such as sunlight, usually has hundreds of times more energy in the visible and near IR region than in the LWIR region. In accordance with this invention, the vanadium dioxide film and its substrate strongly absorb the radiation in the visible and near IR region. The radiation is converted to heat which heats the VO$_2$ film. When the environmental radiation is stronger than a certain threshold, the VO$_2$ film temperature increases above the 68° C. phase change temperature, at which point the VO$_2$ film changes to the metal phase and starts to reflect the radiation, including the wavelength to which the detector is sensitive—that is, LWIR. Thus the optical limiter of this invention is "dark" at high illumination fluence.

The present optical limiter device may also include a heat loss device to balance the temperature. Accordingly, when the incident light fluence decreases below the threshold, the heat-loss device may be employed to blow the heat away from the vanadium dioxide film, at which point the film recovers back to the semiconductor phase.

The description of the present invention in this application is focused on VO$_2$. However, other vanadium oxides (such as vanadium sesquioxide, V$_2$O$_3$) and some non-vanadium semiconductor materials, e.g., germanium crystal, also can change from a semiconductor phase to a metal phase upon heating. In their semiconductor phases, these materials are transparent to LWIR radiation. In their metal phases, these materials reflect LWIR radiation. The phase change is temperature-dependent. For example, the phase change temperature of V$_2$O$_3$ is –123° C. and the phase change temperature of germanium crystal is 130° C. Inasmuch as the phase change temperature of VO$_2$ is just above room temperature (viz., 68° C.), VO$_2$ is particularly convenient for many applications. Those skilled in the art are capable of selecting a particular phase-changing material for use depending upon the environment in which it is to be employed. Those skilled in the art are also capable of adjusting the phase change temperature of such phase-changing materials. For instance, the 68° C. phase change temperature of VO$_2$ can be lowered by doping titanium onto a layer of VO$_2$.

Figure 3:
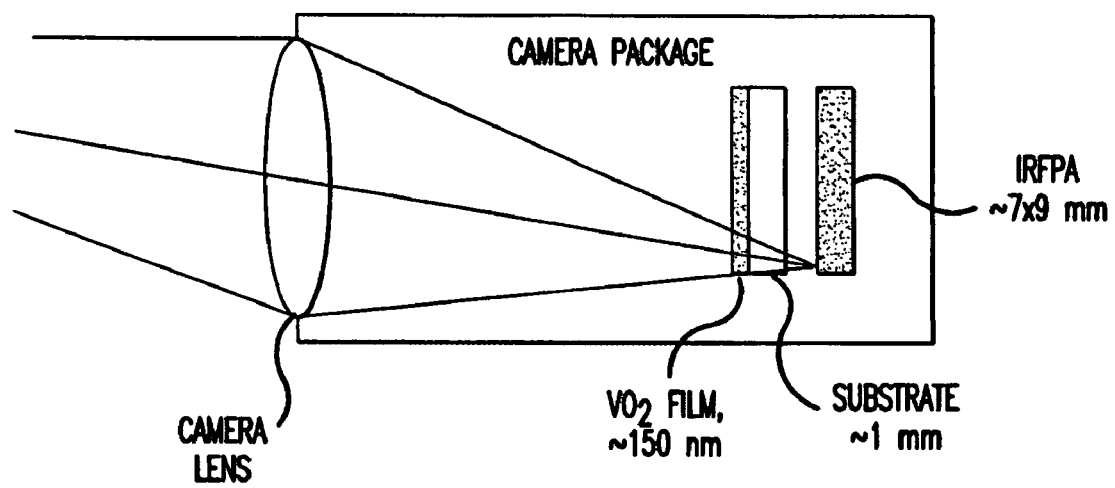
FIG. 3 is a schematic cross-sectional illustration of an embodiment of the present invention in a camera.

FIG. 3 is a schematical cross-sectional view of an embodiment of the LWIR optical limiter device of the present invention, located within a camera. As depicted in FIG. 3, the LWIR optical limiter, comprised of VO$_2$ film and substrate, is located in front of the Infrared Focal Plane Array (IRFPA). Radiation, e.g. sunlight, passes through the lens into the camera. Near infrared radiation in the sunlight heats the VO$_2$ film. At about 100 W/cm$^2$ near infrared incidence, the VO$_2$ switching time (that is, phase change time) is on the order of milliseconds.

The vanadium dioxide layer can be incorporated into the device of the present invention by a two-step procedure: pulsed laser deposition (PLD) of a substoichiometric vanadium oxide, followed by annealing to create VO$_2$. The vanadium dioxide layer is deposited on the substrate. The pulsed laser deposition is carried out in a commercial PLD chamber (for instance, an Epion PLD 3000). In a typical PLD procedure, the beam from a KrF excimer laser at a wavelength of 248 nm with 25 Hz pulse rate is focused onto a pure vanadium target at a fluence of approximately 4 mJ/cm$^2$. The beam energy is controlled by splitting off a very small fraction of the laser beam prior to entering the PLD chamber and using it for feedback through the control of the PLD system. The number of laser pulses required to deposit 100 nm of oxide on the substrate is typically on the order of 5×10$^4$. Laser rastering and the distance between the rotating target and the substrate are adjusted so that the ablation plume covers the substrate uniformly. A typical target-substrate distance is 7 cm. This procedure is conducted at room temperature. The background vacuum level before introducing oxygen is maintained under 3×10$^{-6}$ Torr. The PLD-deposited film is subsequently annealed. A typical oxygen pressure in the deposition and annealing processes is 5 mTorr.

In addition to the uses described herein, the optical limiter of this invention can be incorporated into a variety of other useful apparatuses. For instance, the optical limiter of this invention can be incorporated into the passive broadband long wave and mid-wave infrared optical limiting prism that is disclosed in copending U.S. patent application Ser NO. 11/012,106 by Wu, Dalakos, Lawrence, and Lorraine, entitled "Passive Broadband Long Wave and Mid-Wave Infrared Optical Limiting Prism", filed concurrently herewith. The entire disclosure of this copending application is expressly incorporated by reference in the present application. Those skilled in the art will readily conceive of still other apparatus configurations in which the optical limiter of this invention can be used.

The present invention is described as a broadband infrared limiter. It will be understood, however, that the description provided hereinabove is merely illustrative of the application of the principles of the present invention, the scope of which is to be determined by the claims viewed in light of the specification. Other variants and modifications of the present invention will be readily apparent to those skilled in the art.

What is claimed is:

1. A passive broadband long wave infrared radiation (LWIR) optical limiter device comprising an infrared (IR) limiting layer pair selected so that energy from visible and near infrared radiation having wavelengths in the range 3 to 5 microns activates said LWIR optical limiter and thereby prevents undesired radiation from impinging upon a radiation-sensitive detector device protected by said LWIR optical limiter device, wherein said optical limiter device comprises an IR limiting layer pair in which
an external layer closer to a source of radiation comprises a material, selected from the group consisting of vanadium dioxide and vanadium sesquioxide, that can change from a semiconductor phase to a metal phase upon heating and in which
an internal layer further from the source of radiation comprises chalcogenide glass material that strongly absorbs radiation except for radiation of the wavelength region to which the device is sensitive,
wherein the external layer and the internal layer are adjacent to each other, and
wherein said device comprises a broadband interference filter coating that transmits radiation of 7~4 microns wavelength and reflects radiation of other wavelengths.

2. A passive broadband long wave infrared radiation (LWIR) optical limiter device comprising an infrared (IR) limiting layer pair selected so that energy from visible and near infrared radiation activates said LWIR optical limiter, wherein said device comprises an IR limiting layer pair in which
an external layer closer to a source of radiation comprises a layer of vanadium dioxide about 10 to 1000 nm in thickness, that can change from a semiconductor phase to a metal phase upon heating and in which
an internal layer further from the source of radiation comprises a layer of Ge$_{33}$As$_{12}$Se$_{55}$ about 0.1 to 5 mm in thickness that strongly absorbs radiation except for radiation of the wavelength region to which the device is sensitive.

3. The optical limiter device of claim 2, wherein said device comprises a broadband interference filter coating that transmits radiation of 7-14 microns wavelength and reflects radiation of other wavelengths.

4. A camera protected against sunlight by the incorporation into said camera of the passive broadband LWIR optical limiter device of claim 3.

5. The optical limiter device of claim 3, wherein said broadband interference filter coating comprises layers of thorium fluoride and zinc selenide about 10 to 1000 nanometers in thickness.

6. A camera protected against sunlight by the incorporation into said camera of the passive broadband LWIR optical limiter device of claim 5.

7. A camera protected against sunlight by the incorporation into said camera of the passive broadband LWIR optical limiter device of claim 2.

8. A camera protected against sunlight by the incorporation into said camera of a passive broadband LWIR optical limiter device comprising an infrared (IR) limiting layer pair selected so that energy from visible and near infrared radiation activates said LWIR optical limiter, wherein said camera comprises an infrared focal plane array, and
said device incorporated into said camera comprises an IR limiting layer pair in which
an external layer closer to a source of radiation comprises a material, selected from the group consisting of vanadium dioxide and vanadium sesquioxide, that can change from a semiconductor phase to a metal phase upon heating and in which
an internal layer further from the source of radiation comprises chalcogenide glass material that strongly absorbs radiation except for radiation of the wavelength region to which the device is sensitive,
wherein the external layer and the internal layer are adjacent to each other.

* * * * *